(12) United States Patent
Eoff et al.

(10) Patent No.: US 7,131,493 B2
(45) Date of Patent: Nov. 7, 2006

(54) METHODS OF USING SEALANTS IN MULTILATERAL JUNCTIONS

(75) Inventors: Larry S. Eoff, Duncan, OK (US); Don M. Everett, Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 275 days.

(21) Appl. No.: 10/759,676

(22) Filed: Jan. 16, 2004

(65) Prior Publication Data

US 2005/0159319 A1 Jul. 21, 2005

(51) Int. Cl.
*E21B 33/138* (2006.01)

(52) U.S. Cl. .................................. 166/295; 166/300

(58) Field of Classification Search .................. None
See application file for complete search history.

(56) References Cited

U.S. PATENT DOCUMENTS

| | | | |
|---|---|---|---|
| 2,238,671 A | 4/1941 | Woodhouse | |
| 2,703,316 A | 3/1955 | Schneider | |
| 2,869,642 A | 1/1959 | McKay et al. | |
| 3,047,067 A | 7/1962 | Williams et al. | |
| 3,176,768 A | 4/1965 | Brandt et al. | |
| 3,272,650 A | 9/1966 | MacVittie | |
| 3,316,965 A | 5/1967 | Watanabe | |
| 3,375,872 A | 4/1968 | McLaughlin et al. | 166/29 |
| 3,404,735 A | 10/1968 | Young et al. | |
| 3,415,320 A | 12/1968 | Young | |
| 3,492,147 A | 1/1970 | Young et al. | |
| 3,659,651 A | 5/1972 | Graham | |
| 3,681,287 A | 8/1972 | Brown et al. | |
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,854,533 A | 12/1974 | Gurley et al. | 166/276 |
| 3,857,444 A | 12/1974 | Copeland | 166/276 |
| 3,863,709 A | 2/1975 | Fitch | 165/1 |
| 3,868,998 A | 3/1975 | Lybarger et al. | 166/278 |
| 3,888,311 A | 6/1975 | Cooke, Jr. | 166/280 |
| 3,912,692 A | 10/1975 | Casey et al. | 260/78.3 |

(Continued)

FOREIGN PATENT DOCUMENTS

CA   2063877   5/2003

(Continued)

OTHER PUBLICATIONS

SPE 30096 entitled "Factors Affecting Proppant Flowback with Resin Coated Proppants" by S.W. Almond et al., dated 1995.

(Continued)

*Primary Examiner*—Zakiya W. Bates
(74) *Attorney, Agent, or Firm*—Craig W. Roddy; Baker Botts L.L.P.

(57) ABSTRACT

Methods for the completion of subterranean well bores in a multilateral well system are provided. More particularly, methods are provided for the sealing of junctions between lateral well bores and a parent well bore. The sealants used in accordance with the methods provided generally comprise any sealing composition which can be placed within a subterranean formation, and injected a sufficient distance into a region of the formation surrounding a junction between a first well bore and a second well bore in fluid communication with the first well bore, so as to prevent the undesired entry of formation fluids into either well bore in the region surrounding the junction.

60 Claims, 5 Drawing Sheets

U.S. PATENT DOCUMENTS

| | | | |
|---|---|---|---|
| 3,948,672 A | 4/1976 | Harnsberger | 106/90 |
| 3,955,993 A | 5/1976 | Curtice et al. | 106/90 |
| 3,960,736 A | 6/1976 | Free et al. | 252/8.55 R |
| 4,008,763 A | 2/1977 | Lowe, Jr. | 166/253 |
| 4,029,148 A | 6/1977 | Emery | 166/250.1 |
| 4,042,032 A | 8/1977 | Anderson et al. | 166/276 |
| 4,070,865 A | 1/1978 | McLaughlin | 61/36 |
| 4,074,760 A | 2/1978 | Copeland et al. | 166/276 |
| 4,169,798 A | 10/1979 | DeMartino | 252/8.55 R |
| 4,172,066 A | 10/1979 | Zweigle et al. | 260/29.6 TA |
| 4,245,702 A | 1/1981 | Haafkens et al. | 166/307 |
| 4,273,187 A | 6/1981 | Satter et al. | 166/250 |
| 4,291,766 A | 9/1981 | Davies et al. | 166/276 |
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstoesser et al. | 166/295 |
| 4,415,805 A | 11/1983 | Fertl et al. | 250/260 |
| 4,439,489 A | 3/1984 | Johnson et al. | 428/404 |
| 4,443,347 A | 4/1984 | Underdown et al. | 252/8.55 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |
| 4,526,695 A | 7/1985 | Erbstoesser et al. | 252/8.55 R |
| 4,527,627 A | 7/1985 | Graham et al. | 166/280 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | 252/8.55 R |
| 4,572,803 A | 2/1986 | Yamazoe et al. | 534/16 |
| 4,649,998 A | 3/1987 | Friedman | 166/294 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,675,140 A | 6/1987 | Sparks et al. | 264/4.3 |
| 4,683,954 A | 8/1987 | Walker et al. | 166/307 |
| 4,694,905 A | 9/1987 | Armbruster | 166/280 |
| 4,715,967 A | 12/1987 | Bellis et al. | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,072 A | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,886,354 A | 12/1989 | Welch et al. | 356/70 |
| 4,888,240 A | 12/1989 | Graham et al. | 428/403 |
| 4,895,207 A | 1/1990 | Friedman et al. | 166/276 |
| 4,903,770 A | 2/1990 | Friedman et al. | 166/288 |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,082,056 A | 1/1992 | Tackett, Jr. | 166/295 |
| 5,107,928 A | 4/1992 | Hilterhaus | 166/293 |
| 5,128,390 A | 7/1992 | Murphey et al. | 523/130 |
| 5,135,051 A | 8/1992 | Facteau et al. | 166/104 |
| 5,142,023 A | 8/1992 | Gruber et al. | 528/354 |
| 5,165,438 A | 11/1992 | Facteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutts et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Csabai et al. | 521/63 |
| 5,232,961 A | 8/1993 | Murphey et al. | 523/414 |
| 5,238,068 A | 8/1993 | Fredickson | 166/307 |
| 5,247,059 A | 9/1993 | Gruber et al. | 528/354 |
| 5,249,628 A | 10/1993 | Surjaatmadja | 166/305 |
| 5,256,729 A | 10/1993 | Kutts et al. | 524/700 |
| 5,273,115 A | 12/1993 | Spafford | 166/281 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrigues | 166/295 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmajda et al. | 175/67 |
| 5,363,916 A | 11/1994 | Himes et al. | 166/276 |
| 5,373,901 A | 12/1994 | Norman et al. | 166/300 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,492,178 A | 2/1996 | Nguyen et al. | 166/276 |
| 5,494,103 A | 2/1996 | Surjaatmadja et al. | 166/222 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |
| 5,551,513 A | 9/1996 | Surles et al. | 166/278 |
| 5,551,514 A | 9/1996 | Nelson et al. | 166/280 |

| | | | | | | |
|---|---|---|---|---|---|---|
| 5,582,249 A | 12/1996 | Caveny et al. ............. 166/276 | 6,059,035 A | 5/2000 | Chatterji et al. ............ 166/293 |
| 5,582,250 A | 12/1996 | Constien .................... 166/280 | 6,059,036 A | 5/2000 | Chatterji et al. ............ 166/294 |
| 5,588,488 A | 12/1996 | Vijn et al. ................... 166/293 | 6,068,055 A | 5/2000 | Chatterji et al. ............ 166/293 |
| 5,591,700 A | 1/1997 | Harris et al. ................ 507/204 | 6,069,117 A | 5/2000 | Onan et al. .................. 507/202 |
| 5,594,095 A | 1/1997 | Gruber et al. ............... 528/354 | 6,070,667 A * | 6/2000 | Gano ........................ 166/313 |
| 5,595,245 A | 1/1997 | Scott, III ................. 166/250.1 | 6,074,739 A | 6/2000 | Katagiri ...................... 428/323 |
| 5,597,784 A | 1/1997 | Sinclair et al. ........... 507/212.9 | 6,079,492 A | 6/2000 | Hoogteijling et al. ....... 166/276 |
| 5,604,184 A | 2/1997 | Ellis et al. .................. 507/117 | 6,098,711 A | 8/2000 | Chatterji et al. ............ 166/294 |
| 5,604,186 A | 2/1997 | Hunt et al. .................. 507/204 | 6,114,410 A | 9/2000 | Betzold ...................... 523/130 |
| 5,609,207 A | 3/1997 | Dewprashad et al. ........ 166/276 | 6,123,871 A | 9/2000 | Carroll .................... 252/301.36 |
| 5,620,049 A | 4/1997 | Gipson et al. ............... 166/248 | 6,123,965 A | 9/2000 | Jacon et al. ................ 424/489 |
| 5,639,806 A | 6/1997 | Johnson et al. ............. 523/208 | 6,124,246 A | 9/2000 | Heathman et al. .......... 507/219 |
| 5,670,473 A | 9/1997 | Scepanski ................... 510/445 | 6,130,286 A | 10/2000 | Thomas et al. ............. 524/507 |
| 5,697,440 A | 12/1997 | Weaver et al. .............. 166/281 | 6,135,987 A | 10/2000 | Tsai et al. .................... 604/365 |
| 5,698,322 A | 12/1997 | Tsai et al. ................... 428/373 | 6,140,446 A | 10/2000 | Fujiki et al. .................. 528/15 |
| 5,712,314 A | 1/1998 | Surles et al. ................. 521/41 | 6,148,911 A | 11/2000 | Gipson et al. ............... 166/248 |
| 5,732,364 A | 3/1998 | Kalb et al. ....................... 588/8 | 6,152,234 A | 11/2000 | Newhouse et al. .......... 166/403 |
| 5,765,642 A | 6/1998 | Surjaatmadja .............. 166/297 | 6,162,766 A | 12/2000 | Muir et al. ................... 507/267 |
| 5,775,425 A | 7/1998 | Weaver et al. .............. 166/276 | 6,169,058 B1 | 1/2001 | Le et al. ...................... 507/222 |
| 5,782,300 A | 7/1998 | James et al. ................ 166/278 | 6,172,011 B1 | 1/2001 | Card et al. ................... 507/204 |
| 5,783,822 A | 7/1998 | Buchanan et al. .......... 250/259 | 6,172,077 B1 | 1/2001 | Curtis et al. ................. 514/278 |
| 5,787,986 A | 8/1998 | Weaver et al. .............. 166/280 | 6,176,315 B1 | 1/2001 | Reddy et al. ................ 166/295 |
| 5,791,415 A | 8/1998 | Nguyen et al. .............. 166/276 | 6,177,484 B1 | 1/2001 | Surles |
| 5,799,734 A | 9/1998 | Norman et al. .............. 166/278 | 6,184,311 B1 | 2/2001 | O'Keefe et al. .............. 525/438 |
| 5,806,593 A | 9/1998 | Surles ........................ 166/270 | 6,187,834 B1 | 2/2001 | Thayer et al. ................ 522/15 |
| 5,830,987 A | 11/1998 | Smith ........................ 528/332 | 6,189,615 B1 | 2/2001 | Sydansk ..................... 166/270 |
| 5,833,000 A | 11/1998 | Weaver et al. .............. 166/276 | 6,192,985 B1 | 2/2001 | Hinkel et al. ................ 166/280 |
| 5,833,361 A | 11/1998 | Funk ........................... 366/80 | 6,192,986 B1 | 2/2001 | Urlwin-Smith .............. 166/295 |
| 5,836,392 A | 11/1998 | Urlwin-Smith .............. 166/295 | 6,196,317 B1 | 3/2001 | Hardy ........................ 166/295 |
| 5,837,656 A | 11/1998 | Sinclair et al. ............. 507/219 | 6,202,751 B1 | 3/2001 | Chatterji et al. ............ 166/276 |
| 5,837,785 A | 11/1998 | Kinsho et al. ............... 525/527 | 6,209,643 B1 | 4/2001 | Nguyen et al. .............. 166/276 |
| 5,839,510 A | 11/1998 | Weaver et al. .............. 166/276 | 6,209,644 B1 | 4/2001 | Brunet ........................ 166/297 |
| 5,849,401 A | 12/1998 | El-Afandi et al. ........... 428/215 | 6,209,646 B1 | 4/2001 | Reddy et al. ................ 166/300 |
| 5,849,590 A | 12/1998 | Anderson, II et al. ........ 436/27 | 6,210,471 B1 | 4/2001 | Craig ...................... 106/31.08 |
| 5,853,048 A | 12/1998 | Weaver et al. .............. 166/279 | 6,214,773 B1 | 4/2001 | Harris et al. ................. 507/271 |
| 5,864,003 A | 1/1999 | Qureshi et al. .............. 528/141 | 6,231,664 B1 | 5/2001 | Chatterji et al. ............ 106/724 |
| 5,865,936 A | 2/1999 | Edelman et al. ............. 156/310 | 6,234,251 B1 | 5/2001 | Chatterji et al. ............ 166/291 |
| 5,871,049 A | 2/1999 | Weaver et al. .............. 166/276 | 6,238,597 B1 | 5/2001 | Yim et al. .................... 252/512 |
| 5,873,413 A | 2/1999 | Chatterji et al. ............ 166/293 | 6,241,019 B1 | 6/2001 | Davidson et al. ............ 166/249 |
| 5,875,844 A | 3/1999 | Chatterji et al. ............ 166/293 | 6,242,390 B1 | 6/2001 | Mitchell et al. ............. 507/211 |
| 5,875,845 A | 3/1999 | Chatterji et al. ............ 166/293 | 6,244,344 B1 | 6/2001 | Chatterji et al. ............ 166/295 |
| 5,875,846 A | 3/1999 | Chatterji et al. ............ 166/293 | 6,257,335 B1 | 7/2001 | Nguyen et al. .............. 166/280 |
| 5,893,383 A | 4/1999 | Facteau ........................ 137/14 | 6,260,622 B1 | 7/2001 | Blok et al. ................. 166/305.1 |
| 5,893,416 A | 4/1999 | Read ........................... 166/304 | 6,271,181 B1 | 8/2001 | Chatterji et al. ............ 507/219 |
| 5,908,073 A | 6/1999 | Nguyen et al. .............. 166/276 | 6,274,650 B1 | 8/2001 | Cui ............................. 523/457 |
| 5,911,282 A | 6/1999 | Onan et al. .................... 175/72 | 6,279,652 B1 | 8/2001 | Chatterji et al. ............ 166/194 |
| 5,916,933 A | 6/1999 | Johnson et al. ............. 523/208 | 6,279,656 B1 | 8/2001 | Sinclair et al. ............. 166/310 |
| 5,921,317 A | 7/1999 | Dewprashad et al. ........ 166/208 | 6,283,214 B1 | 9/2001 | Guinot et al. ................ 166/297 |
| 5,924,488 A | 7/1999 | Nguyen et al. .............. 166/280 | 6,306,998 B1 | 10/2001 | Kimura et al. ................ 528/12 |
| 5,929,437 A | 7/1999 | Elliott et al. ................. 250/259 | 6,311,773 B1 | 11/2001 | Todd et al. ................... 166/280 |
| 5,944,105 A | 8/1999 | Nguyen ...................... 166/278 | 6,321,841 B1 | 11/2001 | Eoff et al. .................... 166/291 |
| 5,945,387 A | 8/1999 | Chatterji et al. ............ 507/224 | 6,323,307 B1 | 11/2001 | Bigg et al. ................... 528/354 |
| 5,948,734 A | 9/1999 | Sinclair et al. ............. 507/219 | 6,326,458 B1 | 12/2001 | Gruber et al. ............... 528/354 |
| 5,955,144 A | 9/1999 | Sinclair et al. | 6,328,105 B1 | 12/2001 | Betzold ...................... 166/280 |
| 5,957,204 A | 9/1999 | Chatterji et al. ............ 166/295 | 6,328,106 B1 | 12/2001 | Griffith et al. ................ 166/295 |
| 5,960,880 A | 10/1999 | Nguyen et al. .............. 166/280 | 6,330,916 B1 | 12/2001 | Rickards et al. ............ 166/280 |
| 5,964,291 A | 10/1999 | Bourne et al. ............... 166/279 | 6,330,917 B1 | 12/2001 | Chatterji et al. ............ 166/295 |
| 5,969,006 A | 10/1999 | Onan et al. .................. 523/166 | 6,350,309 B1 | 2/2002 | Chatterji et al. ............ 106/677 |
| 5,977,283 A | 11/1999 | Rossitto ........................ 528/44 | 6,357,527 B1 | 3/2002 | Norman et al. .............. 166/300 |
| 5,994,785 A | 11/1999 | Higuchi et al. .............. 527/789 | 6,364,018 B1 | 4/2002 | Brannon et al. ........... 166/280.2 |
| RE36,466 E | 12/1999 | Nelson et al. ............... 166/280 | 6,364,945 B1 | 4/2002 | Chatterji et al. ............ 106/677 |
| 6,003,600 A | 12/1999 | Nguyen et al. .............. 166/281 | 6,367,165 B1 | 4/2002 | Huttlin ......................... 34/582 |
| 6,004,400 A | 12/1999 | Bishop et al. ................... 134/2 | 6,367,549 B1 | 4/2002 | Chatterji et al. ............ 166/292 |
| 6,006,835 A | 12/1999 | Onan et al. .................. 166/295 | 6,372,678 B1 | 4/2002 | Youngman et al. ......... 504/128 |
| 6,006,836 A | 12/1999 | Chatterji et al. ............ 166/295 | 6,376,571 B1 | 4/2002 | Chawla et al. ................. 522/64 |
| 6,012,524 A | 1/2000 | Chatterji et al. ............ 166/295 | 6,387,986 B1 | 5/2002 | Moradi-Araghi et al. ... 523/211 |
| 6,016,870 A | 1/2000 | Dewprashad et al. ........ 166/295 | 6,390,195 B1 | 5/2002 | Nguyen et al. .............. 166/276 |
| 6,024,170 A | 2/2000 | McCabe et al. ............. 166/300 | 6,401,817 B1 | 6/2002 | Griffith et al. ................ 166/295 |
| 6,028,113 A | 2/2000 | Scepanski ................... 514/643 | 6,405,797 B1 | 6/2002 | Davidson et al. ............ 166/249 |
| 6,028,534 A | 2/2000 | Ciglenec et al. ......... 340/856.2 | 6,406,789 B1 | 6/2002 | McDaniel et al. ............ 428/403 |
| 6,040,398 A | 3/2000 | Kinsho et al. ............... 525/527 | 6,408,943 B1 | 6/2002 | Schultz et al. ............... 166/285 |
| 6,047,772 A | 4/2000 | Weaver et al. .............. 166/276 | 6,422,314 B1 | 7/2002 | Todd et al. ................... 166/312 |
| 6,059,034 A | 5/2000 | Rickards et al. ............ 166/280 | 6,439,309 B1 | 8/2002 | Matherly et al. ............. 166/276 |

| Patent Number | Date | Inventor | Class |
|---|---|---|---|
| 6,439,310 B1 | 8/2002 | Scott, III et al. | 166/308 |
| 6,440,255 B1 | 8/2002 | Kohlhammer et al. | 156/283 |
| 6,446,727 B1 | 9/2002 | Zemlak et al. | 166/308 |
| 6,448,206 B1 | 9/2002 | Griffith et al. | 507/219 |
| 6,450,260 B1 | 9/2002 | James et al. | 166/277 |
| 6,454,003 B1 | 9/2002 | Chang et al. | 166/270 |
| 6,458,885 B1 | 10/2002 | Stengel et al. | 524/507 |
| 6,485,947 B1 | 11/2002 | Rajgarhia et al. | 435/139 |
| 6,488,091 B1 | 12/2002 | Weaver et al. | 166/300 |
| 6,488,763 B1 | 12/2002 | Brothers et al. | 106/692 |
| 6,494,263 B1 | 12/2002 | Todd | 166/312 |
| 6,503,870 B1 | 1/2003 | Griffith et al. | 507/219 |
| 6,508,305 B1 | 1/2003 | Brannon et al. | 166/293 |
| 6,527,051 B1 | 3/2003 | Reddy et al. | 166/300 |
| 6,528,157 B1 | 3/2003 | Hussain et al. | 428/325 |
| 6,531,427 B1 | 3/2003 | Shuchart et al. | 507/267 |
| 6,538,576 B1 | 3/2003 | Schultz et al. | 340/859.6 |
| 6,543,545 B1 | 4/2003 | Chatterji et al. | 166/381 |
| 6,552,333 B1 | 4/2003 | Storm et al. | 250/269.3 |
| 6,554,071 B1 | 4/2003 | Reddy et al. | 166/293 |
| 6,555,507 B1 | 4/2003 | Chatterji et al. | 507/219 |
| 6,569,814 B1 | 5/2003 | Brady et al. | 507/201 |
| 6,582,819 B1 | 6/2003 | McDaniel et al. | 428/402 |
| 6,593,402 B1 | 7/2003 | Chatterji et al. | 524/7 |
| 6,599,863 B1 | 7/2003 | Palmer et al. | 507/219 |
| 6,608,162 B1 | 8/2003 | Chiu et al. | 528/129 |
| 6,616,320 B1 | 9/2003 | Huber et al. | 366/156.2 |
| 6,620,857 B1 | 9/2003 | Valet | 522/42 |
| 6,626,241 B1 | 9/2003 | Nguyen | 166/278 |
| 6,632,527 B1 | 10/2003 | McDaniel et al. | 428/402 |
| 6,632,892 B1 | 10/2003 | Rubinsztajn et al. | 525/476 |
| 6,642,309 B1 | 11/2003 | Komitsu et al. | 525/100 |
| 6,648,501 B1 | 11/2003 | Huber et al. | 366/301 |
| 6,659,179 B1 | 12/2003 | Nguyen | 166/227 |
| 6,664,343 B1 | 12/2003 | Narisawa et al. | 525/474 |
| 6,667,279 B1 | 12/2003 | Hessert et al. | 507/225 |
| 6,668,926 B1 | 12/2003 | Nguyen et al. | 166/280 |
| 6,669,771 B1 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,705,400 B1 | 3/2004 | Nguyen et al. | |
| 6,710,019 B1 | 3/2004 | Sawdon et al. | 507/136 |
| 6,713,170 B1 | 3/2004 | Kaneka et al. | 428/323 |
| 6,725,926 B1 | 4/2004 | Nguyen et al. | 166/254.1 |
| 6,725,931 B1 | 4/2004 | Nguyen et al. | 166/280.2 |
| 6,729,404 B1 | 5/2004 | Nguyen et al. | 166/280.2 |
| 6,732,800 B1 | 5/2004 | Acock et al. | 166/308 |
| 6,745,159 B1 | 6/2004 | Todd et al. | 703/10 |
| 6,749,025 B1 | 6/2004 | Brannon et al. | 166/305.1 |
| 6,763,888 B1 | 7/2004 | Harris et al. | 166/305.1 |
| 6,766,858 B1 | 7/2004 | Nguyen et al. | 166/300 |
| 6,776,236 B1 | 8/2004 | Nguyen | 166/279 |
| 6,832,650 B1 | 12/2004 | Nguyen et al. | 166/279 |
| 6,851,474 B1 | 2/2005 | Nguyen | 166/279 |
| 6,887,834 B1 | 5/2005 | Nguyen et al. | 507/221 |
| 2001/0016562 A1 | 8/2001 | Muir et al. | 507/201 |
| 2002/0043370 A1 | 4/2002 | Poe | 166/250.07 |
| 2002/0048676 A1 | 4/2002 | McDaniel et al. | 428/404 |
| 2002/0070020 A1 | 6/2002 | Nguyen | 166/295 |
| 2003/0006036 A1 | 1/2003 | Malone et al. | 166/250.12 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0131999 A1 | 7/2003 | Nguyen et al. | 166/280 |
| 2003/0148893 A1 | 8/2003 | Lungofer et al. | 507/200 |
| 2003/0186820 A1 | 10/2003 | Thesing | 507/200 |
| 2003/0188766 A1 | 10/2003 | Banerjee et al. | 134/7 |
| 2003/0188872 A1 | 10/2003 | Nguyen et al. | 166/308 |
| 2003/0196805 A1 | 10/2003 | Boney et al. | 166/280 |
| 2003/0205376 A1 | 11/2003 | Ayoub et al. | 166/254.2 |
| 2003/0224165 A1 | 12/2003 | Anderson et al. | |
| 2003/0230408 A1 | 12/2003 | Acock et al. | 166/297 |
| 2003/0234103 A1 | 12/2003 | Lee et al. | 166/293 |
| 2004/0000402 A1 | 1/2004 | Nguyen et al. | 166/280 |
| 2004/0014607 A1 | 1/2004 | Sinclair et al. | 507/200 |
| 2004/0014608 A1 | 1/2004 | Nguyen et al. | 507/200 |
| 2004/0040706 A1 | 3/2004 | Hossaini et al. | 166/278 |
| 2004/0040708 A1 | 3/2004 | Stephenson et al. | 166/280.1 |
| 2004/0040713 A1 | 3/2004 | Nguyen et al. | 166/295 |
| 2004/0048752 A1 | 3/2004 | Nguyen et al. | 507/269 |
| 2004/0055747 A1 | 3/2004 | Lee | 166/278 |
| 2004/0106525 A1 | 6/2004 | Willbert et al. | 507/200 |
| 2004/0138068 A1 | 7/2004 | Rimmer et al. | 507/100 |
| 2004/0149441 A1 | 8/2004 | Nguyen et al. | 166/280.1 |
| 2004/0152601 A1 | 8/2004 | Still et al. | 507/100 |
| 2004/0177961 A1 | 9/2004 | Nguyen et al. | 166/280.2 |
| 2004/0194961 A1 | 10/2004 | Nguyen et al. | 166/295 |
| 2004/0206499 A1 | 10/2004 | Nguyen et al. | 166/280.2 |
| 2004/0211559 A1 | 10/2004 | Nguyen et al. | 166/276 |
| 2004/0211561 A1 | 10/2004 | Nguyen et al. | 166/280.2 |
| 2004/0221992 A1 | 11/2004 | Nguyen et al. | 166/295 |
| 2004/0231845 A1 | 11/2004 | Cooke, Jr. | 166/279 |
| 2004/0231847 A1 | 11/2004 | Nguyen et al. | 166/295 |
| 2004/0256099 A1 | 12/2004 | Nguyen et al. | 166/249 |
| 2004/0261995 A1 | 12/2004 | Nguyen et al. | 166/279 |
| 2004/0261997 A1 | 12/2004 | Nguyen et al. | 166/280 |
| 2005/0000731 A1 | 1/2005 | Nguyen et al. | 175/57 |
| 2005/0006093 A1 | 1/2005 | Nguyen et al. | 166/281 |
| 2005/0006096 A1 | 1/2005 | Nguyen et al. | 166/295 |
| 2005/0045326 A1 | 3/2005 | Nguyen | 166/278 |

FOREIGN PATENT DOCUMENTS

| | | |
|---|---|---|
| EP | 0313243 B1 | 10/1988 |
| EP | 0528595 A1 | 8/1992 |
| EP | 0510762 A2 | 11/1992 |
| EP | 0643196 A2 | 6/1994 |
| EP | 0834644 A2 | 4/1998 |
| EP | 0853186 A2 | 7/1998 |
| EP | 0864726 A2 | 9/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1326003 A1 | 7/2003 |
| EP | 1394355 A1 | 3/2004 |
| EP | 1396606 A2 | 3/2004 |
| EP | 1398640 A1 | 3/2004 |
| EP | 1403466 A2 | 3/2004 |
| EP | 1464789 A1 | 10/2004 |
| GB | 1292718 | 10/1972 |
| GB | 2382143 | 4/2001 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 04/037946 A1 | 5/2004 |
| WO | WO 04/038176 A1 | 5/2004 |
| WO | WO 05/021928 A2 | 3/2005 |

OTHER PUBLICATIONS

Halliburton, *CoalStim<sup>SM</sup> Service, Helps Boost Cash Flow From CBM Assets*, Stimulation, HO3679 Oct. 2003, Halliburton Communications.

Halliburton, *Conductivity Endurance Technology For High Permeability Reservoirs, Helps Prevent Intrusion of Formation Material Into the Proppant Pack for Improved Long-term Production*, Stimulation 2003, Halliburton Communications.

Halliburton, *Expedite® Service, A Step-Change Improvement Over Conventional Proppant Flowback Control Systems. Provides Up to Three Times the Conductivity of RCPs.*, Stimulation, HO3296 May 2004, Halliburton Communications.

Halliburton Technical Flier—Multi Stage Frac Completion Methods, 2 pages.

Halliburton *"CobraFrac$^{SM}$ Service, Coiled Tubing Fracturing—Cost-Effective Method for Stimulating Untapped Reserves"*, 2 pages, 2004.

Halliburton *"CobraFrac$^{SM}$ Service, Cost-Effective Technology That Can Help Reduce Cost per BOE Produced, Shorten Cycle time and Reduce Capex"*.

Halliburton Cobra Frac Advertisement, 2001.

Halliburton *"SurgiFrac$^{SM}$ Service, a Quick and cost-Effective Method to Help Boost Production From Openhole Horizontal Completions"*, 2002.

Halliburton, *SandWedge® NT Conductivity Enhancement System, Enhances Proppant Pack Conductivity and Helps Prevent Intrusion of Formation Material for Improved Long-Term Production*, Stimulation, HO2289 May 2004, Halliburton Communications.

Nguyen et al., *A Novel Approach For Enhancing Proppant Consolidation: Laboratory Testing And Field Applications*, SPE Paper No. 77748, 2002.

Owens et al., *Waterflood Pressure Pulsing for Fractured Reservoirs* SPE 1123, 1966.

Felsenthal et al., *Pressure Pulsing—An Improved Method of Waterflooding Fractured Reservoirs* SPE 1788, 1957.

Raza, *"Water and Gas Cyclic Pulsing Method for Improved Oil Recovery"*, SPE 3005, 1971.

Peng et al., *"Pressure Pulsing Waterflooding in Dual Porosity Naturally Fractured Reservoirs"* SPE 17587, 1988.

Dusseault et al, *"Pressure Pulse Workovers in Heavy Oil"*, SPE 79033, 2002.

Yang et al., *"Experimental Study on Fracture Initiation By Pressure Pulse"*, SPE 63035, 2000.

Nguyen et al., *New Guidelines For Applying Curable Resin-Coated Proppants*, SPE Paper No. 39582, 1997.

Kazakov et al., *"Optimizing and Managing Coiled Tubing Frac Strings"* SPE 60747, 2000.

Advances in Polymer Science, vol. 157, *"Degradable Aliphatic Polyesters"* edited by A.-C. Albertson, 2001.

Gorman, *Plastic Electric: Lining up the Future of Conducting Polymers* Science News, vol. 163, May 17, 2003.

Gidley et al., *"Recent Advances in Hydraulic Fracturing,"* Chapter 6, pp. 109-130, 1989.

Simmons et al., *"Poly(phenyllactide): Synthesis, Characterization, and Hydrolytic Degradation, Biomacromolecules"*, vol. 2, No. 2, pp. 658-663, 2001.

Yin et al., *"Preparation and Characterization of Substitued Polylactides"*, Americal Chemical Society, vol. 32, No. 23, pp. 7711-7718, 1999.

Yin et al., *"Synthesis and Properties of Polymers Derived from Substituted Lactic Acids"*, American Chemical Society, Ch. 12, pp. 147-159, 2001.

Cantu et al., *"Laboratory and Field Evaluation of a Combined Fluid-Loss Control Additive and Gel Breaker for Fracturing Fluids,"* SPE 18211, 1990.

Love et al., *"Selectively Placing Many Fractures in Openhole Horizontal Wells Improves Production"*, SPE 50422, 1998.

McDaniel et al. *"Evolving New Stimulation Process Proves Highly Effective In Level 1 Dual-Lateral Completion"* SPE 78697, 2002.

Albertsson et al., *"Aliphatic Polyesters: Synthesis, Properties and Applications"*, Advances in Polymer Science, vol. 57 Degradable Aliphatic Polyesters, 2002.

Dechy-Cabaret et al., *"Controlled Ring-Operated Polymerization of Lactide and Glycolide"* American Chemical Society, Chemical Reviews, A-Z, AA-AD, 2004.

Funkhouser et al., *"Synthetic Polymer Fracturing Fluid For High-Temperature Applications"*, SPE 80236, 2003.

*Chelating Agents*, Encyclopedia of Chemical Technology, vol. 5 (764-795), undated.

Vichaibun et al., *"A New Assay for the Enzymatic Degradation of Polylactic Acid, Short Report"*, ScienceAsia, vol. 29, pp. 297-300, 2003.

CDX Gas, CDX Solution, 2003, CDX, LLC, Available @ www.cdxgas.com/solution.html, printed pp. 1-2, undated.

CDX Gas, *"What is Coalbed Methane?"* CDX, LLC, Available @ www.cdxgas.com/what.html, printed p. 1, undated.

Halliburton brochure entitled "Pillar Frac Stimulation Technique" Fracturing Services Technical Data Sheet, 2 pages, undated.

SPE 15547 "Field Application of Lignosulfonate Gels To Reduce Channeling, South Swan Hills Miscible Unit, Alberta, Canada" by O. R. Wagner, et al., 1986.

Halliburton brochure entitled "H$_2$Zero™ Service Introducing the Next Generation of Cost-Effective Conformance Control Solutions" dated 2002.

Halliburton brochure entitled "INJECTROL® A Component" dated 1999.

Halliburton brochure entitled "INJECTROL® G Sealant" dated 1999.

Halliburton brochure entitled "INJECTROL® IT Sealant" dated 1999.

Halliburton brochure entitled "INJECTROL® Service Treatment" dated 1999.

Halliburton brochure entitled "INJECTROL® U Sealant" dated 1999.

Halliburton brochure entitled "Sanfix® A Resin" dated 1999.

\* cited by examiner

METHODS OF USING SEALANTS IN MULTILATERAL JUNCTIONS

BACKGROUND OF THE INVENTION

The present invention relates to the completion of subterranean well bores in a multilateral well system. More particularly, this invention relates to the sealing of junctions between lateral well bores and a parent well bore.

Operators seeking to produce hydrocarbons from subterranean formations often employ multilateral wells. Unlike conventional vertical wells, multilateral wells have a series of lateral well bores that branch off a primary well bore, which is typically drilled vertically. Although multilateral wells are often more expensive to drill and complete than conventional vertical wells, multilateral wells are generally more cost-effective overall, as they usually have greater productive capacity and higher recoverable reserves. Because fewer multilateral wells than conventional wells are needed to recover the same amount of hydrocarbons, overall drilling and capital expenses may be reduced. In addition to being cost-effective, multilateral wells are also an attractive choice in situations where it is necessary or desirable to reduce the amount of surface drilling operations, such as when environmental regulations impose drilling restrictions.

Although multilateral wells may offer advantages over conventional vertical wells, they may also involve greater complexity, which may pose additional challenges. One such challenge involves sealing junctions of well bores in the multilateral well system, for example, to prevent the infiltration of foreign matter into the multilateral well system. Infiltration of foreign matter can lead to a variety of problems. For example, if sediment around a junction is loose, it may enter the junction and may potentially impede or block flow within the well system, thereby potentially reducing or eliminating hydrocarbon production from a zone within the subterranean formation. Additionally, the infiltration of hydrocarbons through well bore junctions can lead to simultaneous production from multiple zones, possibly frustrating attempts to isolate and separately produce individual zones. Furthermore, penetration of water through well bore junctions into the hydrocarbon flow within the well system may necessitate additional costs, because the recovered hydrocarbons and any water mixed therein generally must be separated at the surface.

Conventional attempts to seal junctions of well bores have generally involved the placement of cement within an annulus between the formation and the junction of casing strings installed within each well bore. The cement forms a barrier to the formation, but generally does not penetrate into the formation to an appreciable distance, due to factors including, inter alia, the grain size of the cement and the permeability of the formation. Accordingly, a cement seal generally only seals the outer surface of a casing string to the face of the formation. Unfortunately, a cement seal may have a short useful life and is often unable to withstand the high temperatures and pressures typically found in subterranean well systems, along with stresses imparted by high fluid flows in the well bore, or by subsequent drilling operations conducted within the well system (e.g., the insertion and removal of a drilling string to and from the parent well bore, as additional lateral well bores are drilled at other locations lateral to the parent). Further complicating the use of cement to seal junctions is the fact that some form of mechanical isolation (e.g., a packer) is generally needed to prevent the accidental entry into the main well bore of the cement that is intended to seal the outer surface of the casing strings to the formation. Without the use of mechanical isolation, cement oftentimes will enter the main well bore, where it may need to be drilled out at additional expense, labor and time.

Other conventional attempts to seal junctions have involved the use of mechanical sealing devices, such as pieces of narrower piping that fit inside the well bore at a junction in such a manner as to seal the junction. These mechanical sealing devices may be difficult to install, and are also subject to the wear and tear caused by fluid flows and drilling.

SUMMARY OF THE INVENTION

The present invention relates to the completion of subterranean well bores in a multilateral well system. More particularly, this invention relates to the sealing of junctions between lateral well bores and a parent well bore.

An example of a method of the present invention is a method for sealing junctions between subterranean well bores comprising the steps of: placing a sealant into a region of a subterranean formation surrounding a junction between a first well bore and a second well bore that is in fluid communication with the first well bore; and allowing the sealant to solidify therein.

Another example of a method of the present invention is a method of producing hydrocarbons from a multilateral well having at least a first and second well bore in fluid communication with each other, comprising the step of placing a sealant in a desired location to prevent the migration of undesirable fluids and/or particulates into either the first or second well bore from that location.

Another example of a method of the present invention is a method of preventing the flow of undesirable fluids and/or particulates into a multilateral well bore comprising the steps of: placing a sealant into a region of a subterranean formation surrounding a junction between a first well bore and a second well bore that are in fluid communication with each other; and allowing the sealant to penetrate into the formation to a desired depth and solidify therein.

The features and advantages of the present invention will be readily apparent to those skilled in the art upon a reading of the description of the exemplary embodiments which follows.

BRIEF DESCRIPTION OF THE DRAWINGS

A more complete understanding of the present disclosure and advantages thereof may be acquired by referring to the following description taken in conjunction with the accompanying drawings, wherein.

While the present invention is susceptible to various modifications and alternative forms, specific exemplary embodiments thereof have been shown by way of example in the drawing and are herein described. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF EXEMPLARY EMBODIMENTS

The present invention relates to the completion of subterranean well bores in a multilateral well system. More particularly, this invention relates to the sealing of junctions between lateral well bores and a parent well bore.

The methods of the present invention generally comprise placing a sealant into a region of a subterranean formation surrounding a junction between a first well bore and a second well bore that is in fluid communication with the first well bore, and subsequently allowing the sealant to solidify in the region. The sealants used in the present invention generally do not comprise solid particles, and thus are able, when placed in contact with a subterranean formation, to penetrate the formation and solidify within the formation itself.

The sealants used in accordance with the methods of the present invention generally comprise any sealing composition which can be placed within a subterranean formation, and injected a sufficient distance into a region of the formation surrounding a junction between a first well bore and a second well bore in fluid communication with the first well bore, so as to prevent the undesired entry of fluids or particulates into either well bore in the region surrounding the junction. In one embodiment, the sealant comprises a water-soluble polymer and a metal crosslinking agent, wherein the water-soluble polymer further comprises an acrylate group. Such sealants are described in U.S. Pat. Nos. 5,836,392 and 6,196,317, the relevant disclosures of which are hereby incorporated by reference. The water-soluble polymer generally comprises a water-soluble copolymer of at least one nonacidic ethylenically unsaturated polar monomer and at least one copolymerizable ethylenically unsaturated ester. The metal crosslinking agent comprises a metal ion that may be 2, 3 or 4 valent and may be of group 2A, 3A, 4A, 5A, 6A, 7A, 8, 2B, 3B or 4B of the Periodic Table, e.g., Ca, Mg, Ba, Ti, Zr, Fe, Zn, Al or Sn; in certain preferred embodiments, the metal ion is 3 or 4 valent and is a transition metal such as chromium or iron. In certain exemplary embodiments, aluminum may be used. In certain preferred embodiments, the metal is chromium or zirconium. Generally, the metal crosslinking agent takes the form of a salt, e.g., an inorganic salt such as a halide (e.g., chloride, nitrate or sulfate), or as a carboxylate, e.g., a monodentate carboxylate, such as a hydrocarbyl monocarboxylate, e.g., with 1–24 carbon atoms (e.g., 2–6) in the carboxylic acid, which may be an alkanoic acid such as acetate. The metal may also be complexed, e.g., with a ligand, such as a carboxylic acid group, having at least 2, e.g., 2–4 dentate groups in particular, as described in Canadian Patent 2063877, the relevant disclosure of which is herein incorporated by reference. Examples of suitable complexing carboxylic acids include, but are not limited to, hydroxy alkanoic acids, e.g., lactate, glycollate or tartrate. Where the metal crosslinking agent takes the form of a salt or a complex, the salt or complex is water soluble. In another embodiment, the sealant comprises a water-soluble polymer and an organic crosslinking agent, wherein the water-soluble polymer further comprises an acrylate group. Such sealants are described in, for example, U.S. Pat. No. 6,192,986, the relevant disclosure of which is hereby incorporated by reference. The organic crosslinking agents used in such sealants are generally free from metal ions, and are, in certain exemplary embodiments, water-soluble polymers, such as polyalkyleneimines, polyalkylenepolyamines, and mixtures thereof. In certain preferred embodiments, the polyalkylenepolyamines are the polymeric condensates of lower molecular weight polyalkylenepolyamines and a vicinal dihaloalkane. In certain preferred embodiments, the polyalkylenepolyamines may be polyethylenepolyamines and polypropylenepolyamines. In certain preferred embodiments, the polyalkyleneimines are polymerized ethyleneimines or polymerized propyleneimines. Other organic crosslinking agents that can be used include, but are not limited to, water-soluble polyfunctional aliphatic amines, aralkylamines and heteroaralkylamines optionally containing other hetero atoms. Commercially available examples of such sealants are available under the tradename "H2ZERO" from Halliburton Energy Services, Inc., of Duncan, Okla.

In another embodiment, the sealant comprises a crosslinking agent and a water-soluble polymer selected from the group consisting of: polyacrylamide; AMPS® (2-acrylamido-2-methylpropane sulfonic acid)/acrylamide copolymers; sulfonated styrene/maleic anhydride copolymers; vinylpyrrolidone/AMPS®/acrylamide terpolymers; AMPS®/N-N-dimethyl-acrylamide/acrylamide terpolymers; and mixtures thereof, as described in U.S. Pat. No. 6,176,315 B1, the relevant disclosure of which is hereby incorporated by reference. In an exemplary embodiment, the crosslinking agent used in such sealant is an organic crosslinking agent that is generally free from metal ions; in certain exemplary embodiments, the crosslinking agent is a polyalkyleneimine, a polyalkylenepolyamine, or a mixture thereof. In another exemplary embodiment, the crosslinking agent used in such sealant is a metal crosslinking agent. In certain of such embodiments, the metal crosslinking agent comprises a metal ion that may be 2, 3 or 4 valent and may be of group 2A, 3A, 4A, 5A, 6A, 7A, 8, 2B, 3B or 4B of the Periodic Table, e.g., Ca, Mg, Ba, Ti, Zr, Fe, Zn, Al or Sn. In certain preferred embodiments, the metal ion is 3 or 4 valent and is a transition metal such as chromium or iron. In certain exemplary embodiments, aluminum may be used. In certain preferred embodiments, the metal is chromium or zirconium. Generally, the metal crosslinking agent takes the form of a salt, e.g., an inorganic salt such as a halide (e.g., chloride, nitrate or sulfate), or as a carboxylate, e.g., a monodentate carboxylate, such as a hydrocarbyl monocarboxylate, e.g., with 1–24 carbon atoms (e.g., 2–6) in the carboxylic acid, which may be an alkanoic acid such as acetate. The metal may also be complexed, e.g., with a ligand, such as a carboxylic acid group, having at least 2, e.g., 2–4 dentate groups in particular, as described in Canadian Patent 2063877, the relevant disclosure of which is herein incorporated by reference; examples of complexing carboxylic acids include, but are not limited to, hydroxy alkanoic acids, e.g., lactate, glycollate or tartrate. Where the metal crosslinking agent takes the form of a salt or a complex, the salt or complex is preferably water soluble.

In another embodiment, the sealant comprises a water-soluble polymerizable monomer, a multifunctional monomer, and a polymerization initiator, as described in U.S. Pat. No. 5,335,726, the relevant disclosure of which is hereby incorporated by reference. A variety of water-soluble polymerizable monomers can be used with the present invention. Examples of such monomers include acrylic acid, methacrylic acid, acrylamide, methacrylamide, 2-methacrylamido-2-methyl propane sulfonic acid, 2-acrylamido-2-methyl propane sulfonic acid (AMPS®), N-N-dimethylacrylamide, vinyl sulfonic acid, N,N-dimethylaminoethylmethacrylate, 2-triethylammoniumethyl methacrylate chloride, N,N-dimethylaminopropylmethacrylamide, methacrylamide, methacrylamidopropyl trimethylammonium chloride, N-vinyl pyrrolidone, vinylphosphonic acid, methacryloyloxyethyl trimethylammonium sulfate, and mixtures thereof. A variety of multifunctional monomers can be used with the present invention, including, but not limited to, tetraethylene glycol diacrylate, glycerol dimethacrylate, glycerol diacrylate, ethoxylated glycerol dimethacrylate, ethoxylated glycerol diacrylate, propoxylated glycerol dimethacrylate, propoxylated glycerol diacrylate, ethoxylated glycerol trimethacrylate, ethoxylated glycerol triacrylate, propoxylated glycerol trimethacrylate, propoxylated glycerol triacrylate, ethoxylated trimethylol propane trimethacrylate, propoxylated trimethylolpropane trimethacrylate, ethoxylated trimethylolpropane triacrylate, propoxylated trimethylolpropane triacrylate, ethoxylated or propoxylated pentaerythritol di-, tri-, or tetra-methacrylate or acrylate, methylene-bis-acrylamide and methylene-bis-methacrylamide. The polymerization initiator can be any suitable water soluble compound that forms free radicals in aqueous solutions. Such compounds include, but are not limited to, azo compounds, such as 4,4'-azobis (4-cyanopentanoic acid), 2,2'-azobis(N,N'-dimethylene isobutyramidine)dihydrochloride, 2,2'-azobis(2-amidinopropane)dihydrochloride, and 2,2'-azobis(2-methyl-N-(2-hydroxyethyl) propionamide); alkali metal persulfates, such as sodium persulfate, potassium persulfate and ammonium persulfate; peroxides, such as hydrogen peroxide and tertiary-butyl hydroperoxide; oxidation-reduction systems employing reducing agents, such as, bisulfite, sulfite, thiosulfate and metabisulfite in combination with oxidizers such as silver(I), copper(I), iron(III), chlorite and hydrogen peroxide. In another exemplary embodiment, the sealant comprises a self-crosslinking, water-soluble hydroxy unsaturated carbonyl, and a polymerization initiator, as described in U.S. Pat. No. 5,358,051, the relevant disclosure of which is hereby incorporated by reference. A non-limiting list of self-crosslinking, water-soluble hydroxy unsaturated carbonyls may include hydroxyethylacrylate, hydroxymethylacrylate, hydroxyethylmethacrylate, N-hydroxymethylacrylamide, N-hydroxymethylmethacrylamide, polyethylene glycol acrylate, polypropylene glycol acrylate, polyethylene glycol methacrylate, polypropylene glycol methacrylate, and mixtures thereof. The polymerization initiator can be any suitable water soluble compound that forms free radicals in aqueous solutions. Such compounds include, but are not limited to, azo compounds, such as 4,4'-azobis (4-cyanopentanoic acid), 2,2'-azobis(N,N'-dimethylene isobutyramidine)dihydrochloride, 2,2'-azobis(2-amidinopropane)dihydrochloride, and 2,2'-azobis(2-methyl-N-(2-hydroxyethyl) propionamide); alkali metal persulfates, such as sodium persulfate, potassium persulfate and ammonium persulfate; peroxides, such as hydrogen peroxide and tertiary-butyl hydroperoxide; oxidation-reduction systems employing reducing agents, such as, bisulfite, sulfite, thiosulfate and metabisulfite in combination with oxidizers such as silver(I), copper(I), iron(III), chlorite and hydrogen peroxide. Commercially available examples of the sealants described in this paragraph are available under the tradename "PERMSEAL" from Halliburton Energy Services, Inc., of Duncan, Okla.

In another embodiment, the sealant comprises an aqueous alkali metal silicate solution and a delayed activator, commercially available under the tradename "INJECTROL" from Halliburton Energy Services, Inc., of Duncan, Okla., and described in U.S. Pat. Nos. 3,375,872, 5,320,171, and 6,059,036, the relevant disclosures of which are hereby incorporated by reference. A variety of alkali metal silicates can be utilized in accordance with the present invention, including, but not limited to, sodium silicate, potassium silicate, lithium silicate, rubidium silicate, and cesium silicate. A variety of delayed activators may be used in accordance with the present invention. For example, if the required time delay between when the sealing composition is prepared and when it sets is relatively short, any of a variety of esters that undergo hydrolysis in the presence of water and form acids can be used. Examples of such suitable esters are triethyl citrate, ethyl acetate and ethyl glutamate. Other useful delayed activators include, but are not limited to, sodium acid pyrophosphate, lactose, and urea.

In another embodiment, the sealant comprises an epoxide-containing material and a hardening agent, such as those described in U.S. Pat. Nos. 5,873,413, 5,875,844, 5,875,845, 5,875,846, 5,911,282, 5,957,204, 5,969,006, 6,006,836, 6,012,524, 6,059,035, 6,068,055, 6,231,664 6,279,652, 6,321,841, 6,367,549, and 6,503,870, the relevant disclosures of which are hereby incorporated by reference. A variety of epoxide-containing materials may be suitable for use with the present invention, including, but not limited to, diglycidyl ethers of 1,4-butanediol, neopentyl glycol and cyclohexane dimethanol. A variety of hardening agents can be utilized with the epoxide-containing material, including, but not limited to, aliphatic amines, aliphatic tertiary amines, aromatic amines, cycloaliphatic and heterocyclic amines, amido amines, polyamides, polyethyl amines, and carboxylic acid anhydrides. Examples of suitable aliphatic amines are triethylenetetramine, ethylenediamine, N-cocoalkyltrimethylene diamine, isophorone diamine, N-aminoethyl piperazines, imidazoline, and 1,2-diaminecyclohexane. Examples of suitable carboxylic acid anhydrides are methyltetrahydrophthalic anhydride, hexahydrophthalic anhydride, maleic anhydride, polyazelaic polyanhydride, and phthalic anhydride. In another embodiment, the sealant comprises an epoxy resin and a hardening agent. Such sealants are further described in U.S. Pat. Nos. 6,006,835, 6,124,246, 6,244,344, 6,271,181, 6,330,917, 6,350,309, 6,401,817, 6,448,206, and 6,555,507, the relevant disclosures of which are hereby incorporated by reference. In another embodiment, the sealant comprises an epoxy resin and a gas; such sealants are further described in U.S. Pat. No. 6,069,117, the relevant disclosure of which is hereby incorporated by reference.

In another embodiment, the sealant comprises a water-dispersible acrylamide-containing polymer and a water-dispersible crosslinker, the crosslinker comprising an aldehyde and a material selected from the group consisting of phenol, a salicylic acid derivative, phenyl acetate, resorcinol, and hydroquinone. The acrylamide-containing polymer is generally present in the sealant in an amount in the range of from about 0.2% to about 7% by weight of the sealant. Generally, the aldehyde is present in the sealant in an amount in the range of from about 0.05% to about 1% by weight of the sealant. In certain exemplary embodiments wherein the material comprises phenol, phenyl acetate, resorcinol, or hydroquinone, the material is generally present in the sealant in an amount in the range of from about 0.1% to about 1% by weight of the sealant. A nonlimiting list of suitable water-dispersible acrylamide-containing polymers includes homopolymers of acrylamide monomers, and copolymers of acrylamide monomers with an ethylenically unsaturated monomer selected from the group consisting of acrylic acid, methacrylic acid, vinyl sulfonic acid, vinyl benzyl sulfonic acid, vinyl acetate, acrylonitrile, methyl acrylonitrile, vinyl alkyl ether, vinyl chloride, maleic anhydride, vinyl substituted cationic quatenary ammonium compounds, 2-acrylamido-2-methylpropane sulfonic acid (AMPS®), sodium 2-acrylamido-2-methylpropane sulfonate, and vinyl pyrrolidone. The aldehyde used in the crosslinker can be any water-dispersible aldehyde. In one exemplary embodiment, the salicylic acid derivative is selected from the group consisting of salicylamide and acetylsalicylic acid. Such sealants are described in U.S. Pat. No. 4,934,456, the relevant disclosure of which is hereby incorporated by reference.

In another embodiment, the sealant comprises water, an amine-based polymer, a polysaccharide-based polymer; and an oxidizing agent, as described in commonly-owned U.S. patent application Ser. No. 10/727,365, entitled "Well Treatment Fluid and Methods with Oxidized Polysaccharide-Based Polymers," filed on Dec. 4, 2003, the relevant disclosure of which is hereby incorporated by reference. In certain exemplary embodiments, the amine-based polymer comprises at least one member selected from the group consisting of chitosan, chitosan salts, oxidized chitosan, poly(vinyl alcohol-vinyl amine), polylysine, polyethyleneimine, and mixtures thereof. In certain exemplary embodiments, the polysaccharide-based polymer is selected from the group consisting of: starch, cellulose, agarose, partially acetylated cellulose, hydroxyethylcellulose, gum, and mixtures thereof. Examples of suitable gums include, but are not limited to, guar, locust bean gum, gum arabic, tragacanth, gutta percha, xanthan salts, alginate salts, carrageenan, scleroglucan, and mixtures thereof. In certain exemplary embodiments, the oxidizing agent is selected from the group consisting of: alkali, alkaline earth and transition metal salts of materials selected from the group consisting of: periodate, hypochlorite, perbromate, chlorite, chlorate, hydrogen peroxide, soluble peroxide salts, persulfate salts, percarboxylic acids, oxyhalo acids, and mixtures thereof.

In another embodiment, the sealant comprises an oxidized chitosan-based compound and a water-soluble compound having carbonyl groups, as described in U.S. patent application Ser. No. 10/394,898, filed on Mar. 21, 2003, the relevant disclosure of which is hereby incorporated by reference. In an exemplary embodiment, the water-soluble compound having carbonyl groups includes a saturated or unsaturated acrylamide-based polymer. In certain exemplary embodiments, the acrylamide-based polymer is selected from the group consisting of: partially hydrolyzed polyacrylamide (PHPA); a copolymer of acrylamide and t-butyl acrylate; acrylamide/AMPS® copolymer, and mixtures thereof. In another exemplary embodiment, the water-soluble compound having carbonyl groups includes oxidized starch.

In another embodiment, the sealant may comprise water, lignosulfonate, and a dichromate. In certain exemplary embodiments, the sealant may further comprise other additives, including, but not limited to, calcium chloride. One of ordinary skill in the art, with the benefit of this disclosure, will recognize the appropriate amount of a particular additive to include for a particular application. In an exemplary embodiment, the lignosulfonate is present in the sealant in an amount in the range of from about 2% to about 3% by weight of the sealant. In an exemplary embodiment, the dichromate is sodium dichromate. In an exemplary embodiment, the dichromate is present in the sealant in an amount in the range of from about 0.5% to about 3% by weight of the sealant.

In another embodiment, the sealant may comprise a hardenable organic consolidating fluid comprising a hardenable organic resin and a resin-to-sand coupling agent, commercially available from Halliburton Energy Services, Inc., of Duncan, Okla., under the tradename "SANFIX," and described in U.S. Pat. No. 4,042,032, the relevant disclosure of which is hereby incorporated by reference. In certain exemplary embodiments, the hardenable organic resin is selected from the group consisting of: epoxy resins; phenol-aldehyde resins; furfuryl alcohol resins; and urea-aldehyde resins. In certain exemplary embodiments, the resin-to-sand coupling agent is an aminosilane compound selected from the group consisting of: gamma-aminopropyltriethoxysilane; N-beta-(aminoethyl)-gamma-aminopropyltrimethoxysilane; N-beta-(aminoethyl)-N-beta-(aminoethyl)-gamma-aminopropyltrimethoxysilane; N-beta-(aminopropyl)-N-beta-(aminobutyl)-gamma-aminopropyltriethoxysilane; N-beta-di-N-(beta-aminoethyl)-gamma-aminopropyltrimethoxysilane; di-N-beta-(aminoethyl)-gamma-aminopropyl-trimethoxysilane; N-beta-(aminoethyl)-N-beta-(aminoethyl)-gamma-aminopropyltrimethoxysilane; and N-beta-(aminopropyl)-gamma-aminopropyltriethoxysilane. In certain exemplary embodiments, the hardenable organic consolidating fluid is caused to harden by contacting the consolidating fluid with a hardening agent. The hardening agent can be included in the consolidating fluid composition (often referred to as "internal hardening agents") or the consolidating fluid can be contacted with the hardening agent ("external hardening agents") after the consolidating fluid has been placed in the subterranean formation being treated. Internal hardening agents may be selected such that the consolidating fluid hardens after a period of time sufficient to place the consolidating fluid in the subterranean formation. In one exemplary embodiment, the consolidating fluid placed in a formation in accordance with the methods of the present invention is hardened by introducing an overflush solution containing an external hardening agent into the formation after the consolidating fluid has beed placed therein. Suitable hardening agents for consolidating fluid compositions containing epoxy resins include, but are not limited to, amines such as dimethylaminopropylamine, benzyldimethylamine, diethylaminopropylamine, diethylenetriamine, metaxylene diamine, metaphenylene diamine, diaminodiphenylmethane, piperidine, tridimethylaminomethylphenol; acid anhydrides such as oxalic anhydride, phthalic anhydride, pyromellitic dianhydride, dodecynyl succinic anhydride, hexahydrophthalic anhydride and methylbicyclo-(2,2,1)-5-heptene-2-3-dicarboxylic anhydride, and polymercaptans. Examples of internal hardening agents which can be used with consolidating fluids containing furfuryl alcohol resin, phenolaldehyde resins and urea-aldehyde resins include, but are not limited to, hexachloroacetone, 1,1,3-trichloro-trifluoroacetone, benzotrichloride, benzyl chloride, and benzal chloride. Examples of external hardening agents for consolidating fluids including furfuryl alcohol resin, phenol-aldehyde resins and urea-aldehyde resins include, but are not limited to, acyl halide compounds such as phthaloyl chloride, fumaryl chloride, and benzoyl chloride; halogenated organic acids and acid-producing chemicals such as trichloro-acetic acid, benzotrichloride, acetic acid, and formic acid; and inorganic acids such as hydrochloric acid. In certain exemplary embodiments, hardening agents selected from the group consisting of inorganic acids, organic acids and acid-producing chemicals are used.

One of ordinary skill in the art, with the benefit of this disclosure, will be able to identify an appropriate sealant for a chosen application.

Figure 1:
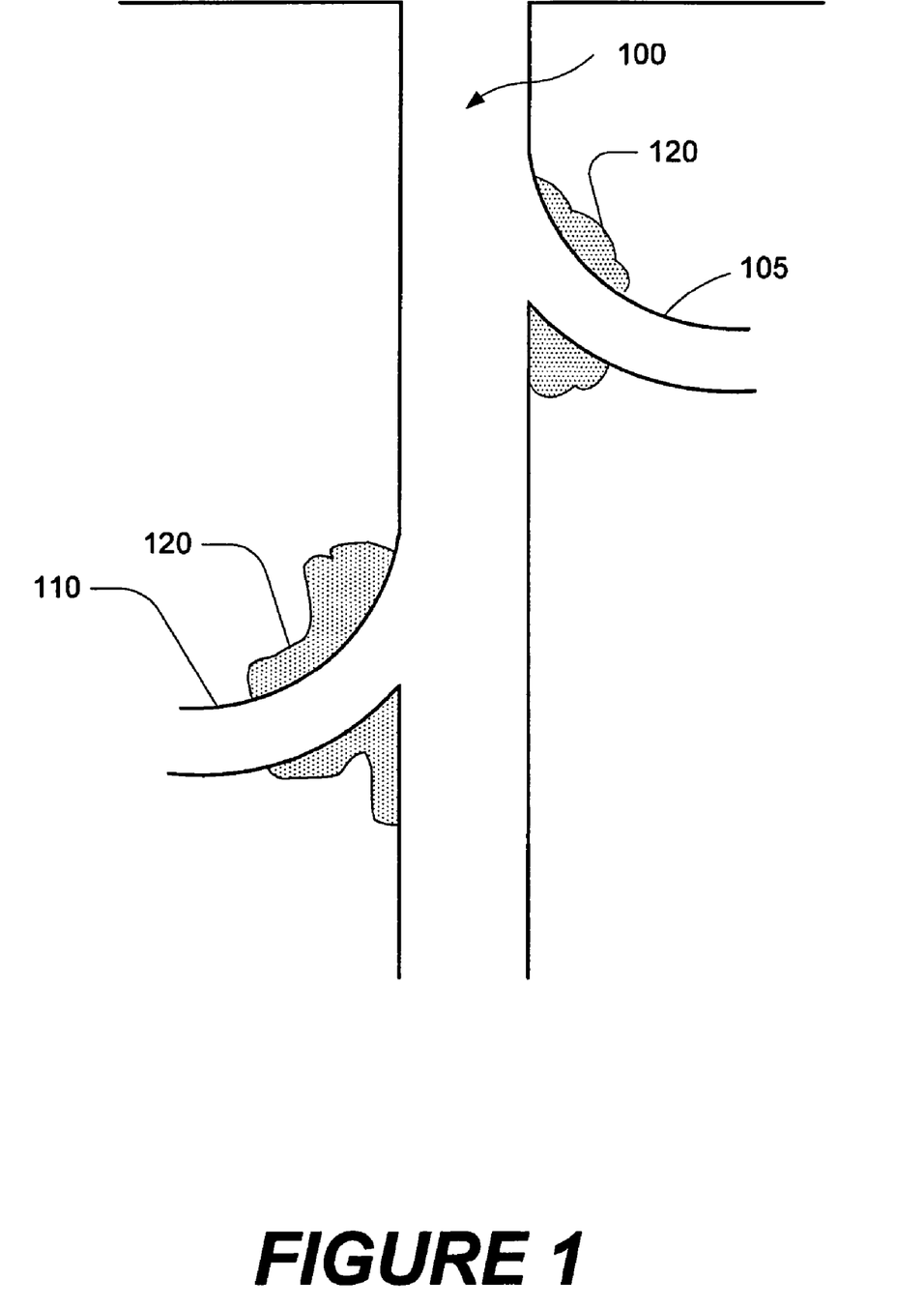
FIG. 1 illustrates an exemplary embodiment of a method of the present invention wherein a sealant has been placed in a region of a subterranean formation surrounding a junction between a first well bore and a second well bore that is in fluid communication with the first well bore.

In one exemplary embodiment of a method of the present invention, a sealant (illustrated at 120 in FIG. 1) is placed into a region of a subterranean formation surrounding a junction between a parent well bore 100 and a lateral well bore 105 or 110 that is in fluid communication with parent well bore 100, and allowed to solidify therein. The amount of sealant to be injected is a function of several variables, including the particular sealant selected for use, the volume of the region of the subterranean formation to be treated, and physical properties of the subterranean formation such as permeability and porosity. One of ordinary skill in the art, with the benefit of this disclosure, will be able to determine the appropriate amount of sealant to be injected for a particular application. Generally, the sealant is injected at a pressure sufficient to inject the sealant into the formation to a desired depth without causing unintended formation fracturing. In certain exemplary embodiments, the sealant is injected into the subterranean formation surrounding the junction to a depth sufficient to resist the flow of undesired fluids from the formation into the well bore. In certain exemplary embodiments, the sealant is injected into the subterranean formation surrounding the junction to a depth of greater than about two inches therein. In certain exemplary embodiments, the sealant is injected into the subterranean formation surrounding the junction to a depth of up to about fifteen feet therein. Among other benefits, such a depth of injection may reduce the wear and tear on the solidified sealant during its life.

Figure 2:
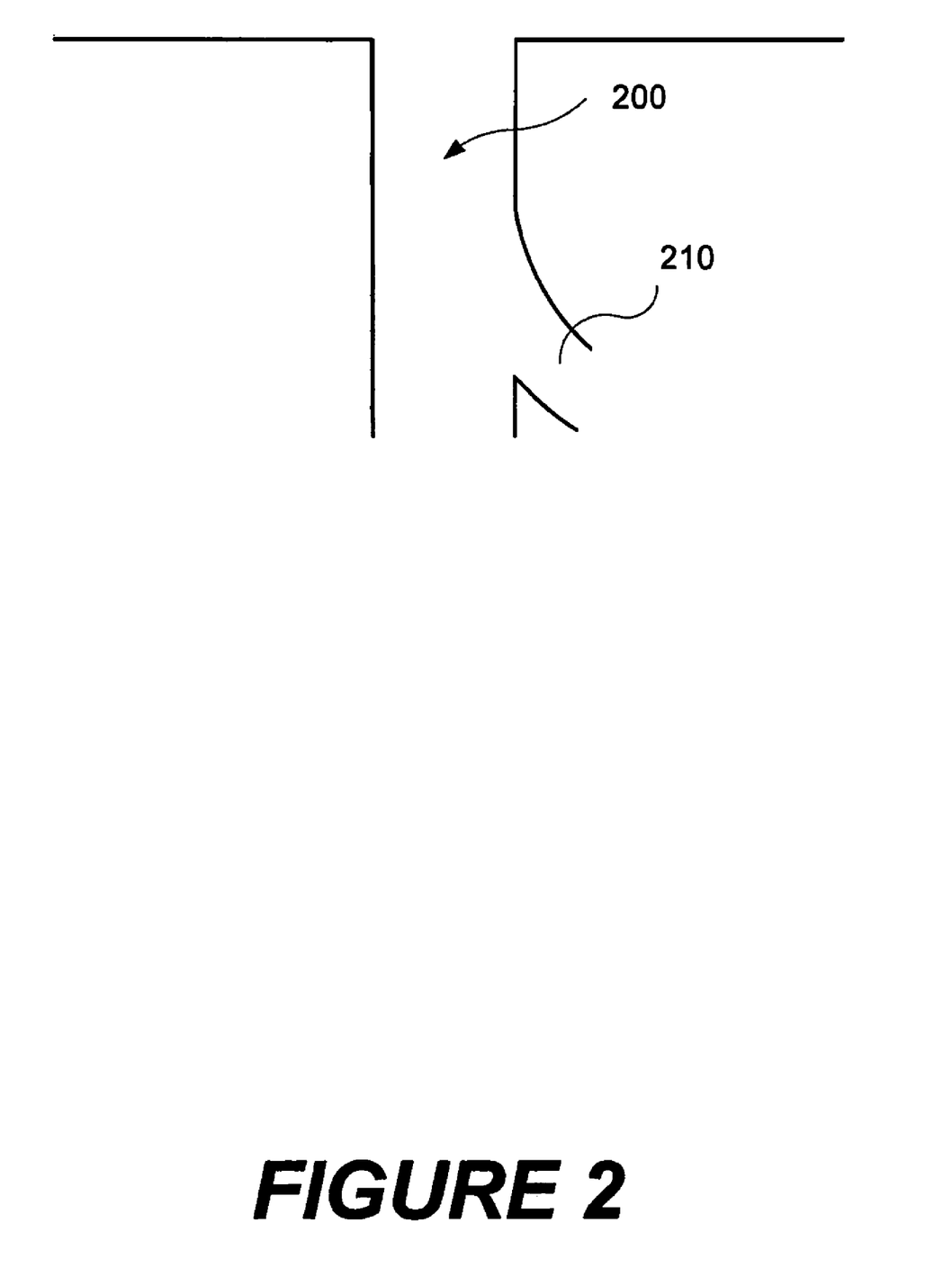
FIG. 2 illustrates an exemplary embodiment of a method of the present invention wherein a first well bore and a second well bore that is in fluid communication with the first well bore are each partially drilled before the placement of sealant.
Figure 3:
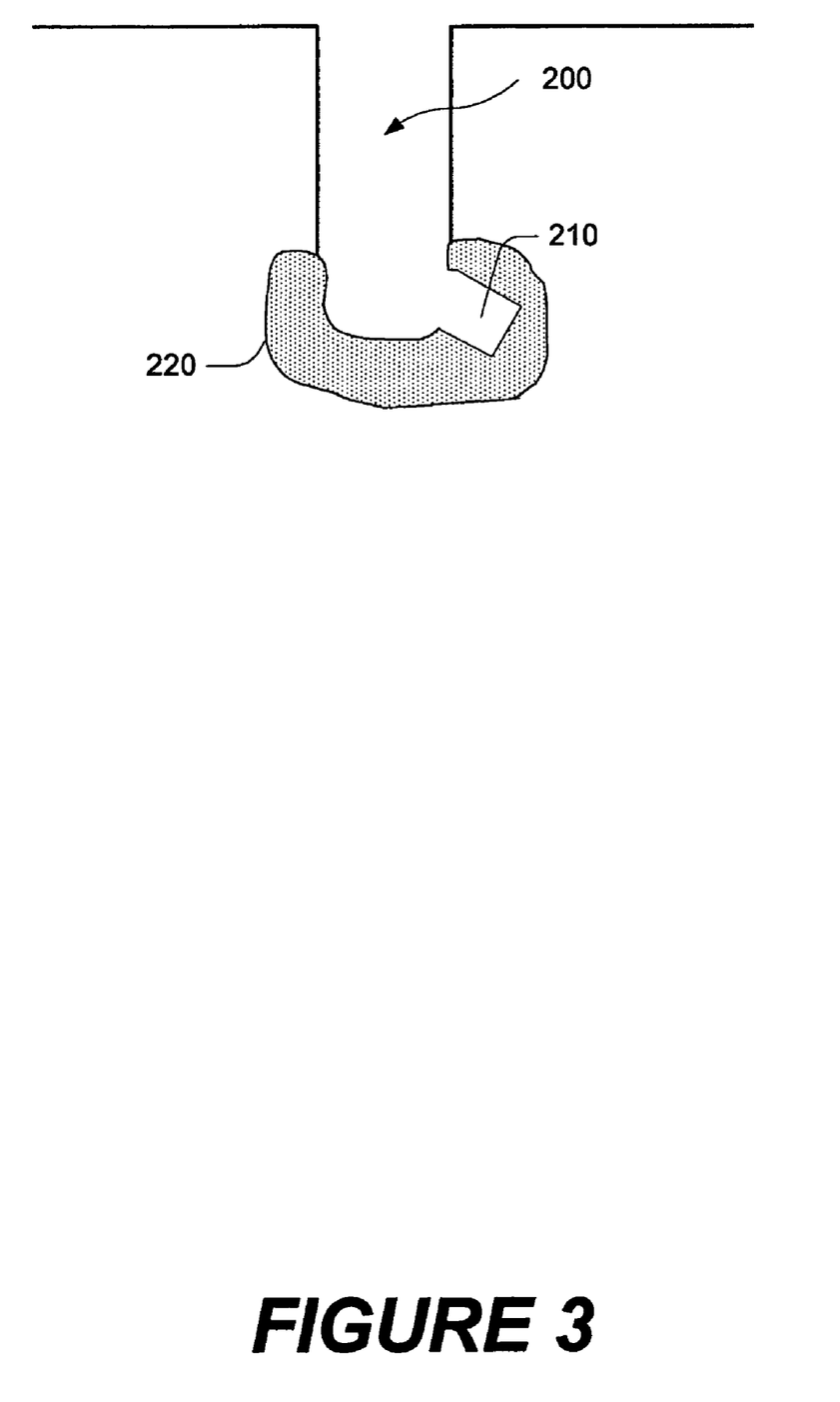
FIG. 3 illustrates an exemplary embodiment of a method of the present invention wherein sealant is placed in a junction between a first well bore and a second well bore that is in fluid communication with the first well bore, the first and second well bore each having been partially drilled.
Figure 4:
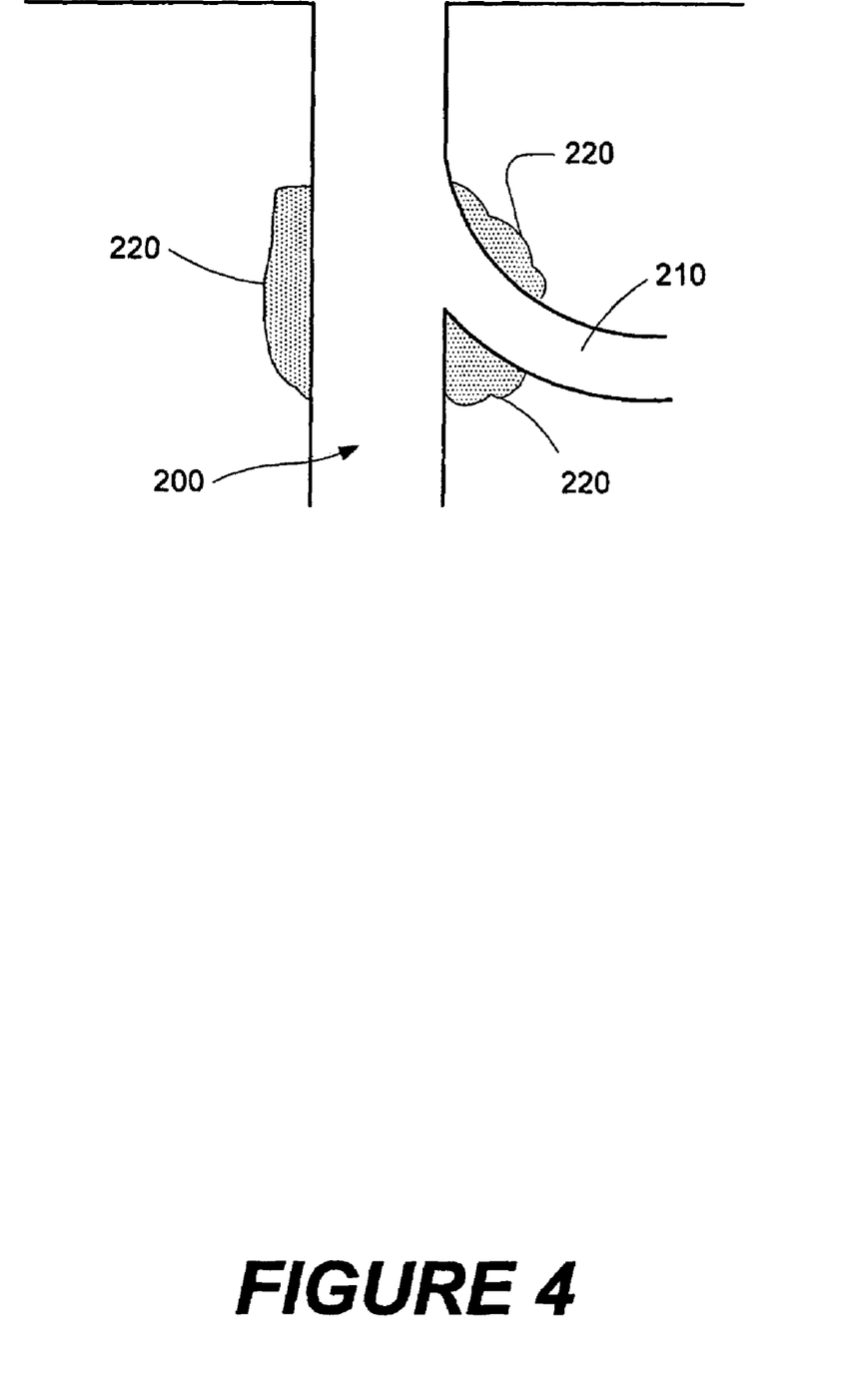
FIG. 4 illustrates an exemplary embodiment of a method of the present invention wherein a first and a second well bore that is in fluid communication with the first well bore are both fully drilled after the placement of a sealant in the junction between the well bores.

An exemplary embodiment of a method of the present invention is illustrated in FIGS. 2–4. Referring now to FIG. 2, a portion of parent well bore 200 is drilled, and a portion of lateral well bore 210 is drilled. Referring now to FIG. 3, sealant 220 is then introduced, and permitted to penetrate the formation around the junction of well bores 200 and 210, and solidify therein. As illustrated in FIG. 4, drilling of lateral well bore 210 and of parent well bore 200 may then be completed. Among other benefits, the use of the sealants of the present invention eliminates the need to use mechanical isolation to prevent the sealant from entering parent well bore 200 or lateral well bore 210. Any sealant 220 that does remain within either well bore 200 or 210 will be washed out when drilling operations are resumed, or will be easily drilled through.

Figure 5:
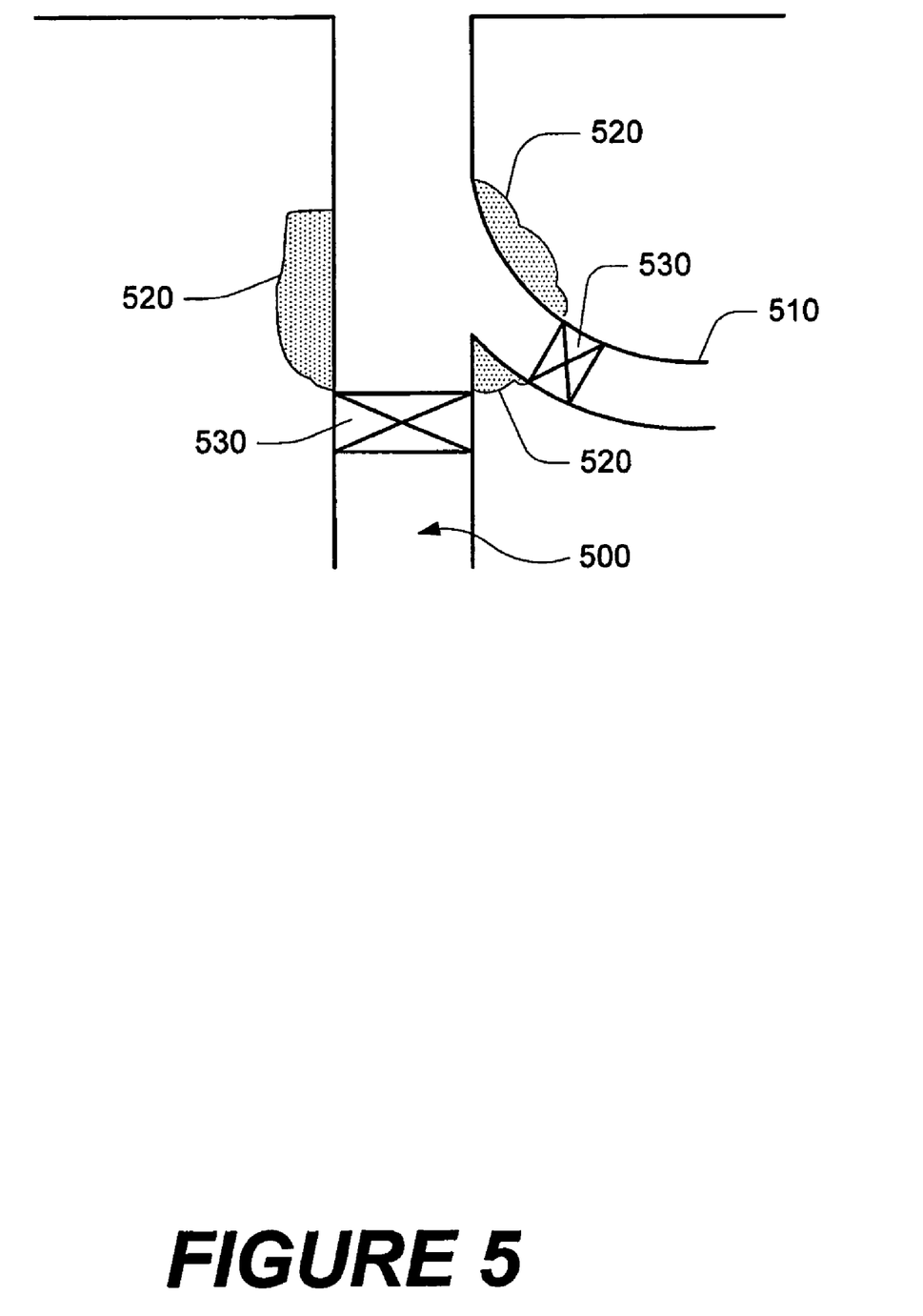
FIG. 5 illustrates an exemplary embodiment of a method of the present invention wherein a sealant is placed in a junction between a first and second well bore that is in fluid communication with the first well bore, the first and second well bore each having been drilled to total depth.

In an exemplary embodiment of the present invention illustrated in FIG. 5, an operator may elect to completely drill one or all lateral well bores 510, and may elect to completely drill the parent well bore 500, before placing a sealant 520 of the present invention in the junctions between lateral well bores 510 and parent well bore 500. In certain of these embodiments, a form of mechanical isolation is used, such as open hole packer 530, or a gel plug (not shown), for example, to control the placement of sealant 520 in the formation (e.g., to ensure that the majority of sealant 520 penetrates and solidifies in the region of the formation surrounding the junction). In certain of these embodiments, the installation of casing strings (not shown) occurs after placement and solidification of sealant 520.

Accordingly, certain exemplary embodiments of the present invention provide a method for sealing junctions between subterranean well bores comprising the steps of: placing a sealant into a region of a subterranean formation surrounding a junction between a first well bore and a second well bore that is in fluid communication with the first well bore; and allowing the sealant to penetrate into the formation to a desired depth and solidify therein. In certain exemplary embodiments, the solidified sealant prevents undesired fluids or particulates from entering either the first or the second well bore in the region of the junction. The sealant may be placed in the region of the formation surrounding the junction by any means suitable to inject the sealant to a desired location. A nonlimiting list of additional steps may include, for example: drilling a portion of the first well bore and/or a portion of the second well bore; drilling out a portion of the solidified sealant from within the first and/or the second well bore; installing casing within a portion of the first and/or the second well bore; injecting cement into the annulus between the formation and the first and/or the second well bore; and permitting the cement to set therein.

Another example of a method of the present invention is a method of producing hydrocarbons from a multilateral well having at least a first and second well bore in fluid communication with each other, comprising the step of placing a sealant in a desired location to prevent the migration of undesirable fluids and/or particulates into either the first or second well bore from that location.

Another example of a method of the present invention is a method of preventing the flow of undesired fluids and/or particulates into a multilateral well bore comprising the steps of placing a sealant into a region of a subterranean formation surrounding a junction between a first well bore and a second well bore that are in fluid communication with each other; and allowing the sealant to penetrate into the formation to a desired depth and solidify therein.

Therefore, the present invention is well adapted to carry out the objects and attain the ends and advantages mentioned as well as those which are inherent therein. While the invention has been depicted, described, and is defined by reference to exemplary embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for sealing junctions between subterranean well bores comprising the steps of:
    placing a sealant comprising a water soluble polymer into a region of a subterranean formation surrounding a junction between a first well bore and a second well bore that is in fluid communication with the first well bore; and allowing the sealant to penetrate into the formation to a desired depth and solidify therein.

2. The method of claim 1 wherein the water-soluble polymer further comprises a water-soluble copolymer of at least one nonacidic ethylenically unsaturated polar monomer and at least one copolymerizable ethylenically unsaturated ester.

3. The method of claim 2 wherein the water-soluble polymer further comprises an acrylate group.

4. The method of claim 1 wherein the sealant further comprises a metal crosslinking agent.

5. The method of claim 4 wherein the metal crosslinking agent comprises chromium, iron, aluminum, or zirconium.

6. The method of claim 4 wherein the metal crosslinking agent is selected from the group consisting of: a halide; a carboxylate; or a complex.

7. The method of claim 1 wherein the sealant further comprises an organic crosslinking agent.

8. The method of claim 7 wherein the organic crosslinking agent is a polyalkyleneimine, a polyalkylenepolyamine, or a mixture thereof.

9. The method of claim 8 wherein the polyalkyleneimine is a polymerized ethyleneimine or a polymerized propyleneimine.

10. The method of claim 8 wherein the polyalkylenepolyamine is polyethylenepolyamine or polypropylenepolyamine.

11. The method of claim 7 wherein the organic crosslinking agent comprises a water-soluble polyfunctional compound selected from the group consisting of: aliphatic amines; aralkylamines; and heteroaralkylamines.

12. The method of claim 1 wherein the sealant further comprises a crosslinking agent.

13. The method of claim 12 wherein the water-soluble polymer is selected from the group consisting of: polyacrylamide; 2-acrylamido-2-methylpropane sulfonic acid/acrylamide copolymers; sulfonated styrene/maleic anhydride copolymers; vinylpyrrolidone /2-acrylamido-2-methylpropane sulfonic acid/acrylamide terpolymers; 2-acrylamido -2-methylpropane sulfonic acid/N-N-dimethyl-acrylamide/ acrylamide terpolymers; and mixtures thereof.

14. The method of claim 12 wherein the crosslinking agent comprises a polyalkyleneimine, a polyalkylenepolyamine, or a mixture thereof.

15. The method of claim 12 wherein the sealant further comprises a metal crosslinking agent.

16. The method of claim 15 wherein the metal crosslinking agent comprises chromium, iron, aluminum, or zirconium.

17. The method of claim 15 wherein the metal crosslinking agent is selected from the group consisting of: a halide; a carboxylate; or a complex.

18. A method for sealing junctions between subterranean well bores comprising the steps of:
placing a sealant comprising a water-soluble polymerizable monomer, a multifunctional monomer, and a polymerization initiator into a region of a subterranean formation surrounding a junction between a first well bore and a second well bore that is in fluid communication with the first well bore; and
allowing the sealant to penetrate into the formation to a desired depth and solidify therein.

19. The method of claim 18 wherein the water-soluble polymerizable monomer further comprises acrylic acid, methacrylic acid, acrylamide, methacrylamide, 2-methacrylamido-2-methyl propane sulfonic acid, 2-acrylamido-2-methyl propane sulfonic acid, N-N-dimethylacrylamide, vinyl sulfonic acid, N,N-dimethylaminoethylmethacrylate, 2-triethylammoniumethyl methacrylate chloride, N,N-dimethylaminopropylmethacrylamide, methacrylamide, methacrylamidopropyl trimethylammonium chloride, N-vinyl pyrrolidone, vinylphosphonic acid, methacryloyloxyethyl trimethylammonium sulfate, or a mixture thereof.

20. The method of claim 17 wherein the multifunctional monomer further comprises tetraethylene glycol diacrylate, glycerol dimethacrylate, glycerol diacrylate, ethoxylated glycerol dimethacrylate, ethoxylated glycerol diacrylate, propoxylated glycerol dimethacrylate, propoxylated glycerol diacrylate, ethoxylated glycerol trimethacrylate, ethoxylated glycerol triacrylate, propoxylated glycerol trimethacrylate, propoxylated glycerol triacrylate, ethoxylated trimethylol propane trimethacrylate, propoxylated trimethylolpropane trimethacrylate, ethoxylated trimethylolpropane triacrylate, propoxylated trimethylolpropane triacrylate, ethoxylated or propoxylated pentaerythritol di-, tri-, or tetramethacrylate or acrylate, methylene-bis-acrylamide, methylene-bis-methacrylamide, or a mixture thereof.

21. The method of claim 18 wherein the polymerization initiator comprises a water soluble compound that forms free radicals in an aqueous solution.

22. The method of claim 21 wherein the polymerization initiator is an azo compound.

23. The method of claim 22 wherein the azo compound is selected from the group consisting of: 4,4'-azobis (4-cyanopentanoic acid), 2,2'-azobis(N,N'-dimethylene isobutyramidine) dihydrochloride, 2,2'-azobis(2-amidinopropane) dihydrochloride, and 2,2'-azobis(2-methyl-N-(2-hydroxyethyl) propionamide).

24. The method of claim 21 wherein the polymerization initiator is selected from the group consisting of: alkali metal persulfates; peroxides; and oxidation-reduction systems employing reducing agents.

25. A method for sealing junctions between subterranean well bores comprising the steps of:
placing a sealant comprising a water-soluble hydroxy unsaturated carbonyl and a polymerization initiator into a region of a subterranean formation surrounding a junction between a first well bore and a second well bore that is in fluid communication with the first well bore; and
allowing the sealant to penetrate into the formation to a desired depth and solidify therein.

26. The method of claim 25 wherein the water-soluble hydroxy unsaturated carbonyl comprises hydroxyethylacrylate, hydroxymethylacrylate, hydroxyethylmethacrylate, N-hydroxymethylacrylamide, N-hydroxymethylmethacrylamide, polyethylene glycol acrylate, polypropylene glycol acrylate, polyethylene glycol methacrylate, polypropylene glycol methacrylate, or a mixture thereof.

27. The method of claim 25 wherein the polymerization initiator further comprises a water-soluble compound that forms free radicals in an aqueous solution.

28. The method of claim 27 wherein the polymerization initiator is selected from the group consisting of: azo compounds; alkali metal persulfates; peroxides; and oxidation-reduction systems employing reducing agents.

29. A method for sealing junctions between subterranean well bores comprising the steps of:
placing a sealant comprising an aqueous alkali metal silicate solution and a delayed activator into a region of a subterranean formation surrounding a junction between a first well bore and a second well bore that is in fluid communication with the first well bore; and allowing the sealant to penetrate into the formation to a desired depth and solidify therein.

30. The method of claim 29 wherein the aqueous alkali metal silicate solution comprises sodium silicate, potassium silicate, lithium silicate, rubidium silicate, or cesium silicate.

31. The method of claim 29 wherein the delayed activator comprises triethyl citrate, ethyl acetate, ethyl glutamate, sodium acid pyrophosphate, lactose, or urea.

32. A method for sealing junctions between subterranean well bores comprising the steps of:
    placing a sealant comprising an epoxy resin and a gas into a region of a subterranean formation surrounding a junction between a first well bore and a second well bore that is in fluid communication with the first well bore; and
    allowing the sealant to penetrate into the formation to a desired depth and solidify therein.

33. The method of claim 32 wherein the epoxy resin is selected from the group consisting of epichlorohydrin and 4,4'- isopropylidenediphenol.

34. The method of claim 32 wherein the gas is selected from the group consisting of air and nitrogen.

35. A method for sealing junctions between subterranean well bores comprising the steps of:
    placing a sealant comprising a water-dispersible acrylamide-containing polymer and a water-dispersible crosslinker into a region of a subterranean formation surrounding a junction between a first well bore and a second well bore that is in fluid communication with the first well bore; and
    allowing the sealant to penetrate into the formation to a desired depth and solidify therein.

36. The method of claim 35 wherein the water-dispersible crosslinker further comprises an aldehyde.

37. The method of claim 36 wherein the water-dispersible crosslinker further comprises a material selected from the group consisting of: phenol; a salicylic acid derivative; phenyl acetate; resorcinol; and hydroquinone.

38. The method of claim 37 wherein the salicylic acid derivative is selected from the group consisting of: salicylamide and acetylsalicylic acid.

39. The method of claim 35 wherein the water-dispersible acrylamide-containing polymer comprises a homopolymer of acrylamide monomer.

40. The method of claim 35 wherein the water-dispersible acrylamide-containing polymer comprises a copolymer of acrylamide monomer with an ethylenically unsaturated monomer selected from the group consisting of: acrylic acid; methacrylic acid; vinyl sulfonic acid; vinyl benzyl sulfonic acid; vinyl acetate; acrylonitrile; methyl acrylonitrile; vinyl alkyl ether; vinyl chloride; maleic anhydride; vinyl substituted cationic quatenary ammonium compounds; 2-acrylamido-2-methylpropane sulfonic acid; sodium 2-acrylamido-2-methylpropane sulfonate; and vinyl pyrrolidone.

41. A method for sealing junctions between subterranean well bores comprising the steps of:
    placing a sealant comprising an amine-based polymer, a polysaccharide-based polymer, and an oxidizing agent into a region of a subterranean formation surrounding a junction between a first well bore and a second well bore that is in fluid communication with the first well bore; and
    allowing the sealant to penetrate into the formation to a desired depth and solidify therein.

42. The method of claim 41 wherein the amine-based polymer comprises at least one member selected from the group consisting of: chitosan; chitosan salts; oxidized chitosan; poly(vinyl alcohol-vinyl amine); polylysine; polyethyleneimine; and mixtures thereof.

43. The method of claim 41 wherein the polysaccharide-based polymer is selected from the group consisting of: starch; cellulose; agarose; partially acetylated cellulose; hydroxyethylcellulose; gum; and mixtures thereof.

44. The method of claim 43 wherein the gum comprises guar, locust bean gum, gum arabic, tragacanth, gutta percha, xanthan salts, alginate salts, carrageenan, scleroglucan, or a mixture thereof.

45. The method of claim 41 wherein the oxidizing agent is selected from the group consisting of: alkali, alkaline earth and transition metal salts of materials selected from the group consisting of: periodate; hypochlorite; perbromate; chlorite; chlorate; hydrogen peroxide; soluble peroxide salts; persulfate salts; percarboxylic acids; oxyhalo acids; and mixtures thereof.

46. A method for sealing junctions between subterranean well bores comprising the steps of:
    placing a sealant comprising an oxidized chitosan-based compound and a water-soluble compound having carbonyl groups into a region of a subterranean formation surrounding a junction between a first well bore and a second well bore that is in fluid communication with the first well bore; and
    allowing the sealant to penetrate into the formation to a desired depth and solidify therein.

47. The method of claim 46 wherein the water-soluble compound having carbonyl groups comprises an acrylamide-based polymer.

48. The method of claim 47 wherein the acrylamide-based polymer is selected from the group consisting of: partially hydrolyzed polyacrylamide; a copolymer of acrylamide and t-butyl acrylate; a copolymer of acrylamide and 2-acrylamido-2-methyl propane sulfonic acid; and mixtures thereof.

49. The method of claim 47 wherein the water-soluble compound having carbonyl groups comprises oxidized starch.

50. A method for sealing junctions between subterranean well bores comprising the steps of:
    placing a sealant comprising water, lignosulfonate and a dichromate into a region of a subterranean formation surrounding a junction between a first well bore and a second well bore that is in fluid communication with the first well bore; and
    allowing the sealant to penetrate into the formation to a desired depth and solidify therein.

51. The method of claim 50 wherein the dichromate is sodium dichromate.

52. The method of claim 50 further comprising calcium chloride.

53. A method for sealing junctions between subterranean well bores comprising the steps of:
    placing a sealant comprising a hardenable organic consolidating fluid, the hardenable organic consolidating fluid further comprising a hardenable organic resin and a resin-to-sand coupling agent into a region of a subterranean formation surrounding a junction between a first well bore and a second well bore that is in fluid communication with the first well bore; and
    allowing the sealant to penetrate into the formation to a desired depth and solidify therein.

54. The method of claim 53 wherein the hardenable organic resin is selected from the group consisting of: epoxy resins; phenol-aldehyde resins; furfuryl alcohol resins; and urea-aldehyde resins.

55. The method of claim 54 wherein the resin-to-sand coupling agent is an aminosilane compound.

56. The method of claim 55 wherein the aminosilane compound is selected from the group consisting of: gamma-aminopropyltriethoxysilane; N-beta-(aminoethyl) -gamma-aminopropyltrimethoxysilane; N-beta-(aminoethyl)-N-beta-(aminoethyl) -gamma-aminopropyltrimethoxysilane; N-beta-(aminopropyl)-N-beta-(aminobutyl) -gamma-aminopropyltriethoxysilane; di-N-(beta-aminoethyl)-gamma-aminopropyltrimethoxysilane; N-beta-(aminoethyl)-gamma-aminopropyl-trimethoxysilane; N-beta-(aminoethyl)-N-beta -(aminoethyl)-gamma-aminopropyltrimethoxysilane; and N-beta-(aminopropyl) -gamma-aminopropyltriethoxysilane.

57. The method of claim 53 further comprising the step of contacting the hardenable organic consolidating fluid with a hardening agent.

58. The method of claim 57 wherein the hardening agent is selected from the group consisting of: dimethylaminopropylamine; benzyldimethylamine; diethylaminopropylamine; diethylenetriamine; metaxylene diamine; metaphenylene diamine; diaminodiphenylmethane; piperidine; tridimethylaminomethylphenol; oxalic anhydride; phthalic anhydride; pyromellitic dianhydride; dodecynyl succinic anhydride; hexahydrophthalic anhydride; methylbicyclo-(2, 2, 1)-5-heptene-2-3-dicarboxylic anhydride; and polymercaptan hardening agents.

59. The method of claim 57 wherein the hardening agent is selected from the group consisting of: hexachloroacetone; 1,1,3-trichloro-trifluoroacetone; benzotrichloride; benzyl chloride; and benzal chloride.

60. The method of claim 57 wherein the hardening agent is selected from the group consisting of: phthaloyl chloride; fumaryl chloride; benzoyl chloride; trichloro-acetic acid; benzotrichloride; acetic acid; formic acid; and hydrochloric acid.

* * * * *